United States Patent [19]

Stenton

[11] Patent Number: 5,864,402
[45] Date of Patent: Jan. 26, 1999

[54] HOLDER FOR HOLOGRAPHIC TESTING OF ASPHERICAL LENSES WITH SPHERICAL AND FLAT REFLECTIVE SURFACES

[75] Inventor: Conrad Stenton, Midland, Canada

[73] Assignee: Raytheon Company, Lexington, Mass.

[21] Appl. No.: 956,799

[22] Filed: Oct. 23, 1997

[51] Int. Cl.⁶ .................................................. G01B 9/02
[52] U.S. Cl. ........................................ 356/359; 356/363
[58] Field of Search .................... 356/359, 360, 356/363, 124, 127, 399, 400; 359/811

[56] References Cited

U.S. PATENT DOCUMENTS

| | | | |
|---|---|---|---|
| 3,507,597 | 4/1970 | Brockway et al. | 356/363 |
| 3,740,150 | 6/1973 | Munnerlyn | 356/360 |
| 5,666,198 | 9/1997 | Stenton | 356/360 |
| 5,684,593 | 11/1997 | Stenton | 356/360 |

*Primary Examiner*—Samuel A. Turner
*Attorney, Agent, or Firm*—W. C. Schubert; G. H. Lenzen, Jr.

[57] ABSTRACT

The present invention provides a lens holder (14) for a lens under test (26) in an in-line hologram interferometric test apparatus (10) which includes a flat reflective surface (34) for rotationally positioning the lens under test and a spherical reflective surface (32) for translationally positioning the lens under test (26). According to this configuration, the lens holder (14) is translationally positioned using the spherical reflective surface (32) to reflect radiation back to the interferometer (12) at a precise distance and position using normal interferometric techniques. The lens under test (26) is rotationally positioned by pivoting the lens holder (14), both in tip and in tilt, so that the flat reflective surface (34) is nulled to the interferometer (12). Thereafter, the lens holder (14) is correctly positioned relative to the hologram (22) and interferometer (12) so that when the lens under test (26) is seated on the lens holder (14), its aspherical shape can be tested.

25 Claims, 1 Drawing Sheet

HOLDER FOR HOLOGRAPHIC TESTING OF ASPHERICAL LENSES WITH SPHERICAL AND FLAT REFLECTIVE SURFACES

BACKGROUND OF THE INVENTION

1. Technical Field

The present invention generally relates to interferometric testing devices and, more particularly, to a holder for a lens under test in an in-line hologram interferometric test apparatus.

2. Discussion

In-line holographic testing employs a hologram interposed in space relation to an interferometer and a lens under test. The interferometer projects a beam of radiation through the hologram towards the lens under test. As the beam propagates through the hologram a wavefront is created which converges to a focal point at a pre-selected focal length from the hologram. From the focal point, the beam diverges to the lens under test.

When the lens under test is correctly positioned with respect to the interferometer, hologram, and focal point, the wavefront is reflected back through the hologram to the interferometer. The hologram converts the wavefront back into an aspherical beam suitable for interference patterning by the interferometer. As such, any abnormalities or errors associated with the lens under test can be detected and analyzed by the interferometer's analysis system.

During this testing, it is critical to correctly position the lens under test with respect to the interferometer in order to accurately and precisely reflect back the aspherical wavefront. The exact position for the lens under test is often dictated by the characteristics of the hologram itself. To properly locate to lens, translational positioning of the lens must be performed in the X, Y and Z planes and rotational positioning of the lens must be performed in tip (about a horizontal axis) and tilt (about a vertical axis).

According to the prior art, the lens under test is secured to a fixture which is initially positioned to the interferometer focus. The lens under test is then iterated to the desired position using slides, scales, and spacers. This technique requires a large degree of optician skill and experience to position the lens under test quickly and accurately. Furthermore, rotational positioning of the lens under test according to the prior art is achieved largely through trial and error.

Accordingly, there is a need in the art for an apparatus and method for quickly and accurately positioning a lens under test relative to an interferometer and hologram in an in-line hologram interferometric test apparatus.

SUMMARY OF THE INVENTION

The above and other objects are provided by a lens holder for a lens under test in an in-line hologram interferometric test apparatus which includes a flat reflective surface for rotationally positioning the lens under test and a spherical reflective surface for translationally positioning the lens under test. According to this configuration, the lens holder is translationally positioned using the spherical reflective surface to reflect radiation back to the interferometer at a precise distance and position using normal interferometric techniques. The lens under test is rotationally positioned by pivoting the lens holder, both in tip and in tilt, so that the flat reflective surface is nulled to the interferometer. Thereafter, the lens holder is correctly positioned relative to the hologram and interferometer so that when the lens under test is seated on the lens holder, its aspherical shape can be tested.

In an alternate embodiment of the present invention, the lens under test may be angled relative to the hologram and interferometer. To accomplish this, the lens seats of the lens holder are oriented at predetermined angles with respect to the flat reflective surface. As such, the lens is appropriately angled relative to the hologram and interferometer when the flat reflective surface is nulled to the interferometer.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DESCRIPTION OF THE PREFERRED EMBODIMENTS

Figure 1:
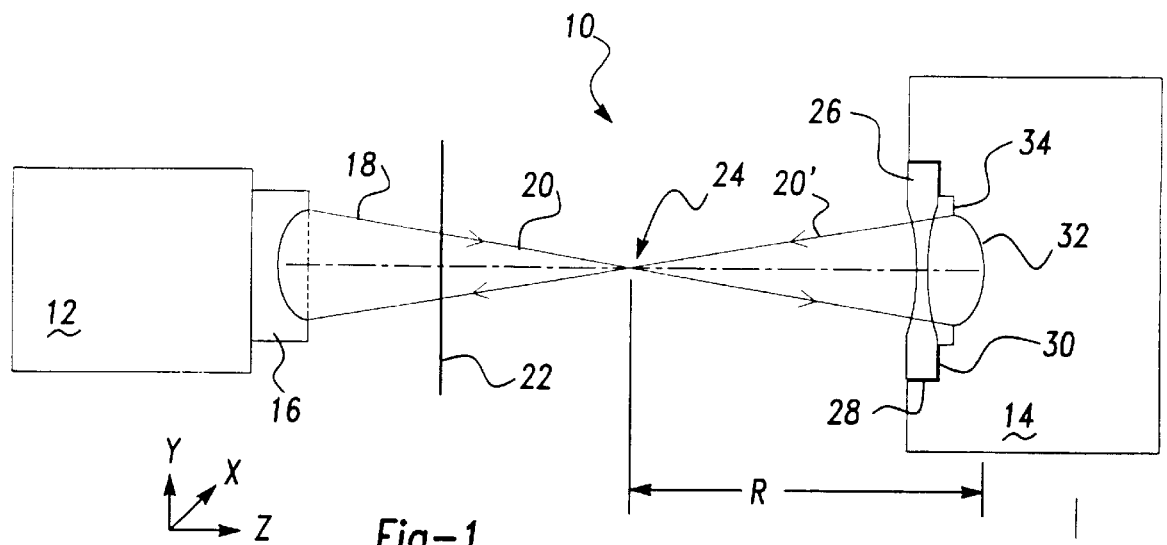
FIG. 1 is a schematic view of an in-line hologram interferometric test apparatus including a lens holder for positioning a lens under test relative to an interferometer and hologram according to the present invention.

The present invention is directed towards a lens holder for supporting and positioning a lens under test in an in-line hologram interferometric test apparatus. The lens holder enables the lens under test to be quickly and easily translated (i.e., in the X, Y and Z planes) and rotated (i.e., about the horizontal and vertical axes) relative to the hologram and the interferometer so that errors in the lens under test can be detected and analyzed by the interferometer. To accomplish this, the lens holder includes a spherically shaped reflective surface which is used in conjunction with the interferometer to translationally position the lens under test with respect to the interferometer and hologram in the X, Y and Z planes. The lens holder also includes a flat (i.e., planar) shaped reflective surface for rotationally positioning the lens under test in conjunction with the interferometer with respect to the hologram and interferometer about the vertical and horizontal axes. The present invention overcomes the shortcomings of the prior art by alleviating the need to initially position the lens under test at the focus of the interferometer and then iterating to position the lens under test at the appropriate location for testing.

Referring now to the drawings, an apparatus 10 for testing aspherical lenses according to the in-line hologram interferometric method is illustrated. The apparatus 10 includes an interferometer 12 of a known type located in spaced relation to a lens holder 14. As depicted, the lens holder 14 is located in radiation receiving relation to the interferometer 12. However, it is to be understood that the present invention is directed towards positioning the lens holder 14 to this location.

A conventional interferometric reference sphere 16 is coupled to the interferometer 12 for shaping the wavefront of the radiation 18 emitted from the interferometer 12. In this case, the reference sphere 16 causes the radiation 18 emitted from the interferometer 12 to be shaped as a spherical beam 20. The spherical beam 20 passes through an in-line hologram 22 interposed between the interferometer 12 and the lens holder 14 and propagates towards the lens holder 14.

The hologram 22 is positioned at a pre-selected location with respect to the interferometer 12 as dictated by the test set-up using the hologram's own conventional positioning system. After passing through the hologram 22, the beam 20 converges to a focal point 24. From the focal point 24, the beam 20 diverges towards the lens holder 14 and a lens under test 26. The hologram 22 creates a wavefront which, when the lens under test 26 is correctly positioned, reflects back through the hologram 22 and is converted back into an aspherical wavefront with errors associated with the lens under test 26 which can be analyzed by the analysis system of the interferometer 12.

The lens holder 14 includes a first lens seat 28 and a second lens seat 30 for supporting the lens under test 26. As described in greater detail below, the second lens seat 30 may also be used to angle the lens under test 26 relative to the spherical beam 20 and interferometer 12. To correctly position the lens under test 26, the lens holder 14 also includes a spherical reflective surface 32 and a flat reflective surface 34. Although it is presently preferred to form the lens holder 14 from brass or other reflective metallic material and then to grind in the reflective surfaces 32 and 34, the skilled artisan will appreciate that other techniques such as silvering may also be utilized for this purpose.

The spherical reflective surface 32 includes a radius of curvature R which is equal to the distance from the focal point 24 required by the holographic test set-up for properly positioning the lens under test 26 relative to the hologram 22 and interferometer 12. One skilled in the art will recognize that this distance varies from test set-up to test set-up as dictated by the hologram employed therein. However, this distance is consistent in that the required spacing between the lens under test 26 and the hologram 22 is known for each test apparatus depending on the hologram used therein and the radius of curvature R is selected such that the lens under test 26 is properly positioned when the spherical reflective surface 32 is properly positioned. As such, when the lens holder 14 is translated to the appropriate position relative to the interferometer 12 and hologram 22, the beam 20 is reflected from the spherical reflective surface 32 along the same ray path to the interferometer 12. This position is indicated by a first known interference pattern displayed on the interferometer 12.

The flat reflective surface 34 is designed such that parallel radiation (to be described in greater detail below with reference to FIG. 2) is reflected directly back to the interferometer 12 when the lens holder 14 is rotated to the appropriate angle relative to the interferometer 12 and hologram 22. The appropriate angle is indicated by a second known interference pattern displayed on the interferometer 12 when the flat reflective surface 34 is nulled to the interferometer 12 and hologram 22. In other words, the lens holder 14 is correctly angled when the flat reflective surface 34 is perpendicular to the parallel radiation.

In order to correctly position the lens under test 26 for interferometric testing, the hologram 22 is placed on the spherical beam 20 emitted from the interferometer 12 at a precisely determined place using the positioning system of the hologram 22. Next, the lens holder 14 is translationally and rotationally positioned relative to the hologram 22 and interferometer 12 as dictated by the holographic test set-up. To accomplish this, the spherical and flat reflective surfaces 32 and 34 are employed to create known interference patterns in the interferometer.

More particularly, the lens holder 14 is translationally positioned in the X, Y and Z planes relative to the interferometer 12 and hologram 22 by using the spherical reflective surface 32 to reflect the wavefront 20' from the interferometer 12 and hologram 22 back to the interferometer 12. Due to its radius of curvature R, the spherical reflective surface 32 creates a first known interference pattern by reflecting the wavefront 20' back to the interferometer 12 when located at a precise distance and position. This location is found by using normal interferometric techniques while translationally adjusting the lens holder 14.

Figure 2:
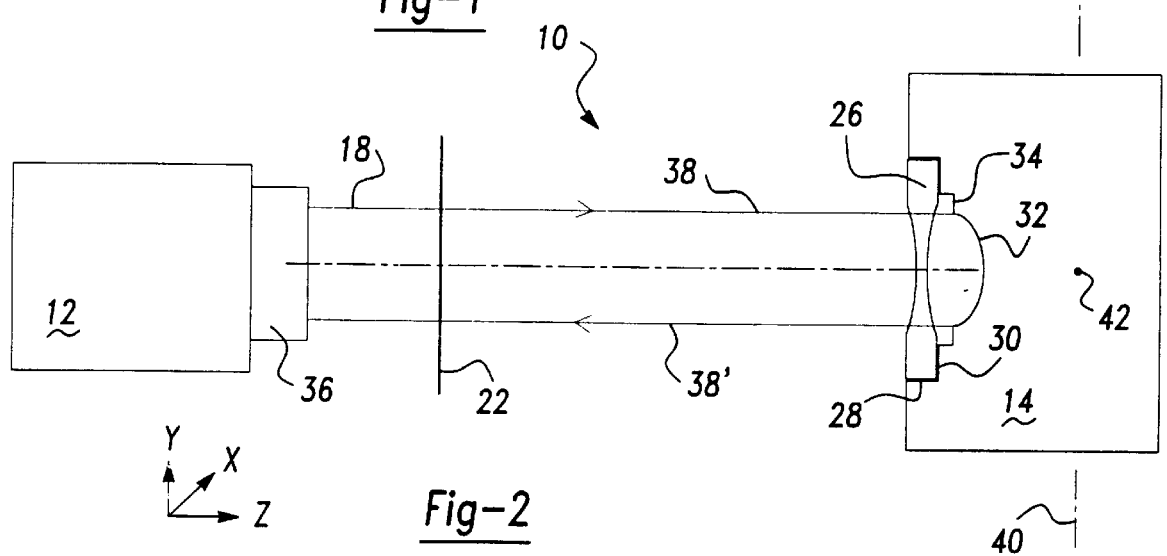
FIG. 2 is a schematic view of the in-line hologram interferometric test apparatus of FIG. 1 wherein a flat reference lens has been substituted for the spherical reference lens on the interferometer.

Referring now to FIG. 2, after the lens holder 14 is appropriately translated, the reference sphere 16 is removed from the interferometer 12 and replaced with a reference flat 36. The reference flat 36 causes the radiation 18 from the interferometer 12 to be shaped as a parallel (i.e., non-spherical) beam 38. The beam 38 passes through the hologram 22 without converging and impinges upon the flat reflective surface 34 of the lens holder 14. When the lens holder 14 is properly angled relative to the interferometer 12 and hologram 22, the flat reflective surface 34 reflects the beam 38' back through the hologram 22 to the interferometer 12. By using normal interferometric techniques while rotating the lens holder 14 about the vertical axis 40 and the horizontal axis 42, the flat reflective surface 34 is positioned so as to be nulled to the interferometer 12.

After translating and rotating the lens holder 12 as described, the lens holder 14 is correctly positioned for supporting the lens under test 26 at the appropriate testing point relative to the hologram 22 and interferometer 12. Accordingly, the lens under test 26 may be placed on the lens seats 28 and 30 and tested for its aspherical shape. An additional benefit of the present invention is that the aspherical shape of the lens under test 26 can be referenced to the mounting features (i.e., lens seats 28 and 30) of the lens holder 14 since their optical characteristics are known from the positioning sequence.

If desired, the reference flat 36 may be removed from the interferometer 12 after rotational positioning and replaced with the reference sphere 16. The translational position of the lens holder 14 can then be verified by using the spherical reflective surface 32 and re-translating in the in X, Y and Z planes if necessary. In order to facilitate the translation and rotation of the lens holder 14, it is preferred that the lens holder 14 be mounted to a standard five axis interferometric holder (not shown).

Figure 3:
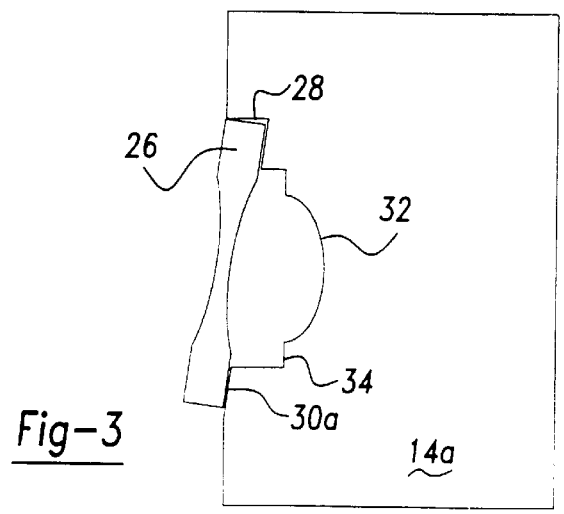
FIG. 3 is a schematic view of an alternate embodiment lens holder according to the present invention wherein the lens under test is angled with respect to the flat reflective surface.

Referring now to FIG. 3, a second embodiment of the lens holder 14a is illustrated. In some instances it may be desirable to angle the lens under test 26 with respect to the hologram 22 (FIGS. 1 and 2) for holographic testing. To accomplish this, the second lens seat 30a of the lens holder 14a is oriented at a preselected angle with respect to the flat reflective surface 34. As such, when the flat reflective surface 34 is nulled relative to the interferometer 12, the second lens seat 30a is appropriately positioned for holding the lens under test 26 at the correct angle relative to the spherical beam 20, interferometer 12 and hologram 22 (FIGS. 1 and 2).

Accordingly, the present invention provides an in-line hologram interferometric test apparatus for testing aspherical lenses. The test apparatus includes a lens holder having optical references for positioning the lens under test precisely with respect to the in-line hologram and the interferometer. The lens holder advantageously allows the lens under test to be positioned at the correct distance from the interferometer as well as at the correct angle with respect to the hologram plane without requiring a translation or trial and error iterations from the interferometer's focal point.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A test apparatus for testing a lens in conjunction with an interferometer and an in-line hologram, said apparatus comprising:

an interferometer for emitting and receiving radiation having a known wavefront shape;

a lens holding member positionable in spaced relation to said interferometer for supporting said lens under test at a location for interferometric testing;

a spherical reflector associated with said lens holding member for reflecting said radiation back to said interferometer such that an interference pattern is formed therein for guiding a translation of said lens holding member relative to said interferometer, said spherically shaped reflective surface having a pre-selected radius of curvature; and a flat reflector associated with said lens holding member for reflecting said radiation back to said interferometer such that an interference pattern is formed therein for guiding a rotation of said lens holding member relative to said interferometer.

2. The apparatus of claim 1 wherein said radius of curvature corresponds to a distance between said lens under test and said in-line hologram as dictated by the holographic test set-up.

3. The apparatus of claim 1 wherein said spherical reflector further comprises a spherically shaped reflective surface formed in said lens holding member.

4. The apparatus of claim 1 wherein said flat reflector further comprises a flat reflective surface formed on said lens holding member.

5. The apparatus of claim 1 further comprising a spherical reference lens removably coupled to said interferometer for shaping said radiation emitted from said interferometer as a spherical wavefront.

6. The apparatus of claim 1 further comprising a flat reference lens removably coupled to said interferometer for shaping said radiation emitted from said interferometer as a parallel beam.

7. The apparatus of claim 1 further comprising a lens seat formed in said lens holding member for supporting said lens under test at a predetermined orientation with respect to said interferometer.

8. The apparatus of claim 7 wherein said lens seat includes an angled member for orienting said lens under test at a given angle relative to said flat reflector and said interferometer.

9. The apparatus of claim 1 further comprising a five-axis interferometric holder mounted to said lens holding member for facilitating said translation and said rotation of said lens holding member.

10. The apparatus of claim 1 wherein said known shape of said wavefront is substantially spherical.

11. The apparatus of claim 1 wherein said known shape of said wavefront is substantially parallel.

12. The apparatus of claim 1 wherein said translation guided by said spherical reflector occurs in the X, Y and Z planes.

13. The apparatus of claim I wherein said rotation guided by said flat reflector occurs about vertical and horizontal axes.

14. A test apparatus for testing an aspherical lens for errors in conjunction with an interferometer and an in-line hologram, said apparatus comprising:

an interferometer for emitting and receiving radiation having a known wavefront shape;

a reference lens removably coupled to said interferometer for shaping said wavefront emitted from said interferometer into said known shape;

a lens holding member positionable in spaced relation to said interferometer;

a lens seat formed in said lens holding member for supporting said lens under test at a predetermined location and orientation with respect to said interferometer for interferometric testing;

a spherically shaped reflective surface formed in said lens holding member for guiding a translation of said lens holding member relative to said interferometer, said spherically shaped reflective surface having a pre-selected radius of curvature corresponding to a distance between said lens under test and said in-line hologram as dictated by the holographic test set-up; and a flat reflective surface formed on said lens holding member for guiding a rotation of said lens holding member relative to said interferometer.

15. The apparatus of claim 14 wherein said reference lens further comprises one of the group consisting of a spherical reference lens for shaping said radiation emitted from said interferometer as a spherical wavefront and a flat reference lens for shaping said radiation emitted from said interferometer as a parallel beam.

16. The apparatus of claim 14 wherein said lens seat includes an angled member for orienting said lens under test at a given angle relative to said flat reflective surface and said interferometer.

17. The apparatus of claim 14 further comprising a five-axis interferometric holder mounted to said lens holding member for facilitating said translation and said rotation of said lens holding member.

18. The apparatus of claim 14 wherein said known shape of said wavefront is substantially spherical.

19. The apparatus of claim 14 wherein said known shape of said wavefront is substantially parallel.

20. The apparatus of claim 14 wherein said translation guided by said spherically shaped reflective surface occurs in the X, Y and Z planes.

21. The apparatus of claim 14 wherein said rotation guided by said flat reflective surface occurs about vertical and horizontal axes.

22. A method of positioning a lens under test to a testing location relative to an in-line hologram and an interferometer for interferometric testing, said method comprising:

providing a lens holder for supporting said lens under test, said lens holder including a spherically shaped reflective surface and a flat reflective surface, said spherically shaped reflective surface including a radius of curvature corresponding to a distance between said lens under test and said in-line hologram as dictated by the holographic test set-up;

emitting radiation from said interferometer through said hologram, said radiation having a spherically shaped wavefront;

translating said lens holder relative to said interferometer such that said spherically shaped reflecting surface reflects said spherical wavefront back to said interferometer through said hologram;

further translating said lens holder to form a first known interference pattern in said interferometer by said reflected spherical wavefront;

emitting additional radiation from said interferometer through said hologram, said additional radiation having a parallel wavefront;

rotating said lens holder relative to said interferometer such that said flat reflective surface reflects said parallel wavefront back to said interferometer through said hologram;

further rotating said lens holder to form a second known interference pattern in said interferometer by said reflected parallel wavefront; and securing said lens under test to said lens holder at a known orientation relative to said flat reflective surface, hologram and interferometer.

23. The method of claim 22 further comprising the step of securing a spherical reference lens to said interferometer to shape said radiation as said spherical wavefront.

24. The method of claim 22 further comprising the step of securing a flat reference lens to said interferometer to shape said radiation as said parallel wavefront.

25. The method of claim 22 further comprising the steps of:

emitting further radiation having said spherical wavefront from said interferometer after said step of further rotating said lens holder; and re-translating said lens holder relative to said interferometer to verify said first and second interference patterns formed in said interferometer.

* * * * *